United States Patent
Whitley et al.

[15] 3,667,689
[45] June 6, 1972

[54] METHOD FOR PRODUCING MINERAL PRODUCTS

[72] Inventors: James Brooks Whitley; Joseph Iannicelli, both of Macon, Ga.

[73] Assignee: J. M. Huber Corporation, Locust, N.J.

[22] Filed: Dec. 15, 1969

[21] Appl. No.: 885,168

[52] U.S. Cl. .............................. 241/15, 241/24, 23/110 P, 209/214
[51] Int. Cl. ........................................... B02c 21/00
[58] Field of Search .................. 241/5, 15, 16, 21, 24, 171, 241/184

[56] References Cited

UNITED STATES PATENTS

| | | | |
|---|---|---|---|
| 3,171,718 | 3/1965 | Gunn et al. ............................ | 23/110 P |
| 3,471,011 | 10/1969 | Iannicelli et al. ...................... | 209/214 |
| 3,050,263 | 8/1962 | Barkman et al. ..................... | 241/171 X |
| 3,058,671 | 10/1962 | Billae ...................................... | 241/24 |
| 3,075,710 | 1/1963 | Feld et al. ............................. | 241/24 X |
| 3,464,634 | 9/1969 | Brociner ............................... | 241/24 X |

*Primary Examiner*—Granville Y. Custer, Jr.
*Attorney*—Harold H. Flanders

[57] ABSTRACT

A method for producing minerals of reduced particle size and increased brightness, particularly high grade coating clays employing a hard, abrasive grinding medium following a pretreatment of magnetic separation is disclosed. Coating clays are prepared by the delamination of stack-like particles contained in magnetically extracted coarser clays employing a hard, abrasive grinding medium and high intensity grinding techniques.

4 Claims, 5 Drawing Figures

FIG. I.

METHOD FOR PRODUCING MINERAL PRODUCTS

BACKGROUND OF THE INVENTION

1. FIELD OF THE INVENTION

This invention relates to comminuted mineral products and more particularly to an improved process for the production of delaminated clays having particular utility for use in coating paper.

2. DESCRIPTION OF THE PRIOR ART

As known in the art, clays used for coating paper are identified by the percentage, by weight, of the particles above and below 2 microns (i.e., 2 microns equivalent spherical diameter). For example, the more expensive coating clays may have more than 90 percent by weight of their particles below 2 microns. Clays are further graded according to their brightness as determined in accordance with TAPPI tentative standard T 646 M-54.

For many years, the conventional method of producing high grade kaolin clay as required in the coating of paper has been to deflocculate the crude material in an aqueous suspension and to classify the crude, as by sedimentation, into fine and coarse fractions. While the coarse fraction removed from crude may sometimes be sold as filler clay, the market for this material is limited and filler grade clay is of a value well below coating grade clays. In more recent years, it has been found that so-called delaminated clays produced from coarse or filler grade clays are in many cases superior to coating clays made by the conventional classification of the natural crude. In this regard, delaminated clays, by virtue of the great breadth and thinness of the particles, give a smoother coated surface with improved printability. Further, enhancement in brightness is achieved from delamination for the reason that fresh unstained surfaces are exposed by exfoliation of the kaolin stacks into thin units. In general, and again as known in the art, crude clay deposits, such as Georgia kaolins, contain particles ranging in size from smaller than 0.1 micron to at least 15 microns. Particles smaller than about 1–3 microns in diameter are mostly plate-like in shape with the diameter averaging 6–10 times the thickness. Particles larger than about 1–3 microns are substantially all multi-crystalline stacks composed of varying numbers of single crystals, cemented together in a face-to-face fashion. Coarse clays, as the term is utilized in the present description, include those clays composed substantially of stacks as well as clays composed of mixtures of stacks and fine crystals of kaolin. Delaminated clays are produced from these thick laminated masses by splitting the stacks into thin platey units.

There are presently a number of known and available methods for producing delaminated coating clays. Thus, in U.S. Pat. No. 3,171,718 there is disclosed a process wherein delamination is accomplished by agitating an aqueous slurry with a fine, non-abrasive resilient grinding media such as nylon beads or pellets. In this regard, the concept of using an abrasive grinding medium, such as sand, is also known. An example of this technique is disclosed, e. g., in U.S. Pat. No. 3,075,710 which involves the wet-grinding of a coarse clay utilizing a grinding medium harder than the material to be ground, such as sand. This technique, however, results in excessive discoloring of the clay. In a further known process, delamination is effected by the kneading action of a pugmill without the use of grinding media, an example of this process being disclosed in U.S. Pat. No. 3,058,671. Extrusion and kneading have also been employed.

Though many such above discussed methods have been adopted and have achieved commercial acceptance, none has proved entirely satisfactory. Thus, processes wherein delamination is effected with a pugmill suffer from the disadvantage in that only about one-half of the coarse particles are delaminated, even when powerful pugmill equipment is employed. In such processes the oversize material has to be separated from the delaminated material by a separate classification step. Recycling of the oversize material to the pugmill has proved to be economically impracticable.

In general, attempts to utilize high intensity-grinding equipment employing abrasive grinding media have not been successful due to the fact that the brightness of the product is degraded. Presently, no known coating clays are being commercially produced by this process. While so-called "low intensity" grinding techniques employing non-abrasive or plastic grinding media produce a high quality delaminated clay product, such processes suffer from the inherent disadvantage of slow grinding rates, resulting in the increased cost of production, relatively low yield rates and inability to obtain maximum available brightness. Further, somewhat more complex production procedures are required in such grinding methods of limited intensity.

SUMMARY OF THE INVENTION

In summary, the present invention provides a highly efficient process for producing comminuted minerals, particularly high grade coating clays employing a hard, abrasive grinding medium. In contrast to prior known processes, the present invention provides a method wherein the advantages of hard abrasive grinding medium, i.e. high grinding rates and high yields are obtained without discoloring the delaminated clay product. In its broadest aspect, the method of the present invention comprises the comminution or delamination of magnetically extracted minerals, such as clay with a hard abrasive grinding mechanism. It has been found that the magnetic separation of the clay prior to grinding with a medium harder than the clay itself, such as glass beads, produces an unexpected improvement in the brightness of the final delaminated clay product.

It is accordingly a general object of this invention to provide a unique process for producing comminuted minerals, particularly high brightness delaminated coating clay, said process not subject to the disadvantages of prior known processes.

Another and more particular object of this invention is to provide a highly efficient and economical process for producing high quality coating clays employing high intensity grinding.

Yet another object is to provide a process for grinding relatively coarse kaolinitic clay to extremely fine size employing a hard abrasive grinding medium and fast grinding rates without discoloration of the resulting clay product.

A further object is to provide a process for producing high grade coating clays by the delamination of magnetically extracted coarse filler grade clays with hard abrasive grinding media.

BRIEF DESCRIPTION OF THE DRAWING

The manner in which the foregoing and other objects are achieved in accordance with the present invention will be better understood in view of the following detailed description and accompanying drawing which forms a part of this specification, and wherein.

DESCRIPTION OF THE PREFERRED EMBODIMENT(S)

Figure 1:
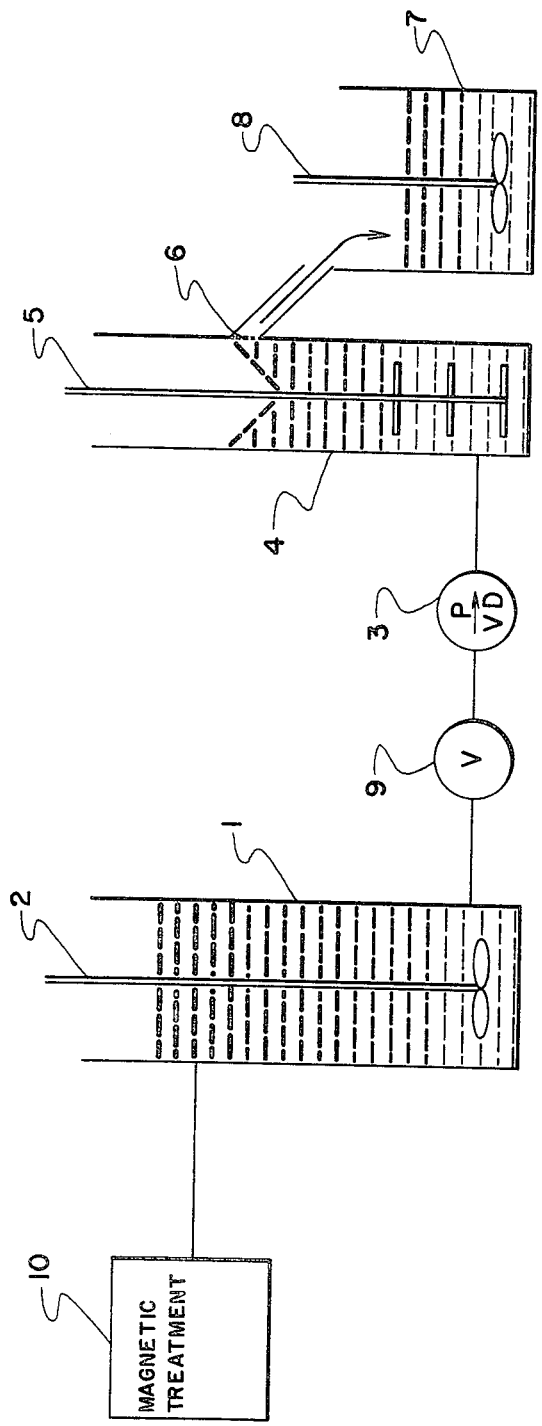
FIG. 1 is a diagrammatic illustration, shown in elevation, of a suitable arrangement of apparatus for carrying out a particularly advantageous embodiment of the invention.

As generally discussed above, up to now the use of hard, abrasive grinding media has made it difficult if not impossible to develop the maximum brightness in delaminated clay products. The present invention is based on the discovery that the predominant deterrant to the development of brightness stems from the comminution of fine, hard, discolored particles in the clay which are high in titanium and iron content. It has been found that this material is sufficiently hard textured to resist grinding by relatively soft, e.g., plastic media, but is pulverized by hard media. In accordance with this invention, these particles or contaminants are removed by subjecting a dispersed clay slurry to magnetic separation prior to delamination. In summary, the use of magnetic separation makes possible the delamination of coarse clay particles with abrasive grinding media resulting in an economical, easily controllable one-step delamination process. The product is fully competitive with, and in many cases superior in brightness to, clays obtained by conventional slow grinding methods.

As known in the art, clay slurries have been subjected to magnetic separation treatment to remove foreign particles or contaminants which are deleterious to clay brightness. Such a technique is disclosed, e.g., in French Patent 1,490,027 and British Patent 1,004,570. In a particularly advantageous embodiment of this invention, the magnetic separation treatment comprises forming a slurry of the coarse kaolinitic clay and then subjecting the slurry to the action of a non-homogeneous magnetic field having an average strength of of at least 1,000 gauss and preferably at least 8,500 gauss. The magnetic treatment can be carried out by employing wet magnetic separator machines such as disclosed in British Patent No. 768,451. A particularly advantageous process of magnetic treatment is disclosed in U. S. Patent No. 3,471,011. A process generally of this type is indicated as a pre-treatment prior to delamination at 10 in FIG. 1. Improved and more efficient high intensity separators may be employed to great advantage. It is particularly advantageous to utilize improved high intensity approaches now within the state of the art. As used herein, the term "wet magnetic separation" refers to the fact that the clay particles, i.e., kaolin and mineral impurities are passed through the separator suspended in the water. The clay slurries are retained within the high intensity magnetic energy field for a controlled period of time, preferably from about 10 seconds up to about 8 minutes. The high intensity of the magnetic energy field may vary from 1,000 gauss to the limitation of the particular machine.

In general, the concentration of the clay slurry is not critical. Thus, the per cent solids may vary from about 15 to about 60 percent while operating at room temperature. Slurries of higher solids concentrations may be used by elevating the slurry temperature. Preferable slurry concentrations at ambient temperatures are in the range of 25–40 percent by weight, solids content. The clay slurries treated in the magnetic energy field are preferably deflocculated, using conventional dispersing agents such as sodium hexametaphosphate. As should be apparent, the slurry may be passed through the magnetic separator more than once to effect successive removals of the contaminants.

In accordance with the improved process of the present invention, the clay slurry is removed from the magnetic field and subjected to delamination by the high intensity grinding action obtained by agitating the clay-water suspension with hard, abrasive grinding media which have a specific gravity higher than the clay-water mixture. As to be described in more detail hereinafter, suitable media include small beads of glass, sand or fused alumina, the former being found to be a particularly advantageous medium. The necessary agitation may be obtained by either high frequency vibration or by mixing with a suitable impeller. The specific gravity of the media is important for the reason that the use of media which are heavier than the clay slurry results in greater impact forces. Further, a faster grinding rate is obtained with a high media to slurry ration, since more impingements are obtained with the greater number of media. The grinding rate also increases with the rate of agitation.

Again, with regard to the abrasive media employed, as referred to above, it has been found that spherical glass beads having a high crush strength and a specific gravity of 2.45 are particularly advantageous.

Glass beads have been found to provide a faster grinding rate than materials such as sand and plastic due to their spherical nature which provides better contact. As compared to sand, they have a lower specific gravity, are easier to suspend, and, thus, require less power in mixing. Glass beads have a higher crushing strength and therefore provide less contamination than sand. The glass beads are more homogeneous in structure and, in general, have less fractures or fissures to weaken them and cause breakage. Also, a variety of glass beads are available with a more uniform spherical shape which results in a faster grinding and better contact of the media. In addition to the before-mentioned variables such as the media/slurry ratio, agitation speed, etc., various effects may be obtained by balancing size versus the number or frequency of impingements. Thus, glass beads permit somewhat tailored results by using various sized distributions of beads. For example, one can achieve optimum effects by proper selection of bead size. An increase in the size of media yields larger grinding intensity and forces but fewer impingements. Further, glass beads provide for better intermittent operation because they are easier to re-suspend on start-up. In summary, the glass beads provide high strength and wear resistance, and are inert and non-contaminating. As set forth above, the specific gravity of the media or beads should be greater than that of the clay-water suspension. A clay-water slurry containing 30 percent clay has a specific gravity of approximately 1.23, whereas the preferred glass beads generally have a specific gravity of about 2.45.

Glass beads suitable for use in the present invention can be e. g., those such as identified as Class IV, Type 203 Uni-Spheres, manufactured by the Microbeads Division of Cataphote Corporation, which have a specific gravity of about 2.45 and a diameter in the range of about 20 mesh to 30 mesh (Tyler standard screen scale). It has been discovered that the use of glass beads, as heretofore described, permits substantially complete reduction to the required fineness in one pass, in contrast to known processes wherein a portion of the ground material must be recycled to the grinding apparatus or discarded. While other media, such as Ottawa sand and small fused alumina spheres, may be employed, such media having a greater specific gravity are more difficult to suspend, require more power in mixing and do not otherwise offer the unique advantages of glass beads.

The process of delamination can be carried out as a batch operation or as a continuous process. Preferably, the delamination is carried out in a continuous manner with the suspension of clay in water circulating through an agitated suspension of beads with the clay suspension flowing from the grinding tank through a screen which restrains the media. In either batchwise or continuous operation, agitation of the hard, abrasive media, e.g., glass beads, in the clay suspension is sufficient to provide the percussive and frictional milling action required to produce delamination. The process is continued until the coarse clay stacks or booklets are delaminated and converted into platelets of the desired or specified particle size. In general, any conventional tank or vessel equipped with agitating means, etc., may be employed in practicing the delamination step of the present invention. Suitable apparatus for delaminating coarse clay fractions are disclosed, e.g., in U.S. Pats. Nos. 3,075,710 and 3,171,718. Preferably, the vessel and agitator are covered with rubber or other suitable elastomer to avoid abrasion and wear of the metal parts.

The invention will be further illustrated by the following specific working examples which set forth particularly advantageous method embodiments employed in the delamination of magnetically extracted coarse clays in accordance with the present invention. Unless otherwise indicated, the apparatus employed in the delamination step is substantially that as illustrated in FIG. 1. The delamination or grinding was effected in a vessel indicated generally at 4, said vessel being provided with a cross arm impeller 5. In the case of batchwise delamination, the dispersed clay slurry and grinding medium were placed directly into the vessel 4 and agitated for a period sufficient to effect the degree of delamination desired. Separation of the ground slurry from the media was effected by screening. In the case of continuous operation, the starting procedure was the same as that in the batchwise procedure. In this case, however, after reducing the initial charge of slurry in the vessel 4 to the desired fineness, the flow of feed slurry from the feed tank 1 was initiated by opening valve 9. The rate of feed flow into the vessel 4 was thereafter controlled by a variable speed pump 3 to provide the necessary retention time in the vessel 4. The delaminated clay slurry overflowed the mixing tank through an 80 mesh screen 6 which served to retain the grinding media in the vessel. The delaminated clay slurry was collected in tank 7. In the following examples a Plexiglass grinding vessel 4 provided with a polyurethane covered impeller 5 was used to prevent contamination and discoloration of the product from the action of the abrasive grinding media on the metal surfaces of the equipment.

EXAMPLE 1

In this example the effect of different variables on the rate of delamination was determined using the batch grinding procedure. The standard cross-arm impeller and 20–30 mesh glass beads were used except as otherwise noted. After grinding, the slurry was separated from the media by screening. The increase in particle fineness of the clay was used as a measure of the rate of delamination.

The starting material was filler grade clay in dispersed slurry form. The clay had the following particle size.

| | |
|---|---|
| Coarser than 10 microns | 16.8 |
| Coarser than 5 microns | 38.5 |
| Finer than 2 microns | 35.2 |

A. EFFECT OF MEDIA/SLURRY RATIO

Figure 2:
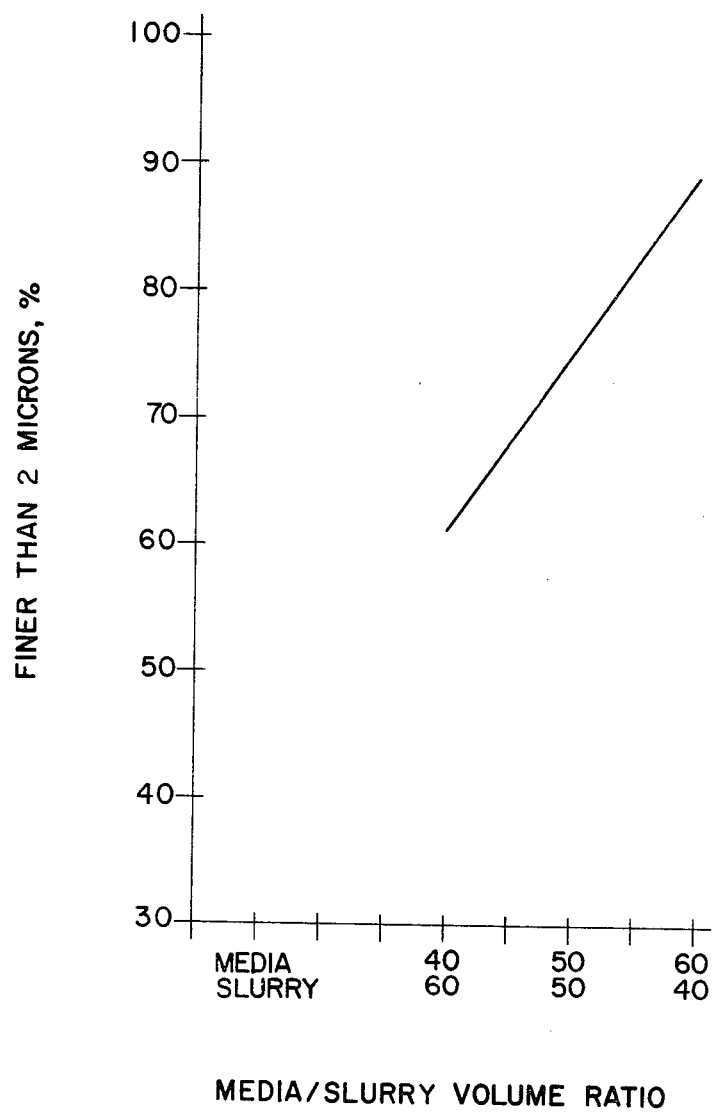
FIG. 2 is a graph showing the effect of the grinding media/slurry ratio.

The media/slurry ratio was varied from 40:60 to 60:40, calculated on a true volume basis. Other conditions in the tests were the same, including total volume of mixture in the mixing tank, impeller speed, mixing time (retention) and concentration of the clay slurry. FIG. 2 shows the effect of media/slurry ratio for a 30 percent solids slurry with a mixing time of 30 minutes and impeller speed of 1,300 feet per minute (f.p.m). As shown in FIG. 2, the rate of grinding was increased as the volume of media to volume of slurry was increased. However, a 55:45 media/slurry ratio is about the highest practical volume of media with which good flow was obtained in the tank.

B. EFFECT OF IMPELLER SPEED

Figure 3:
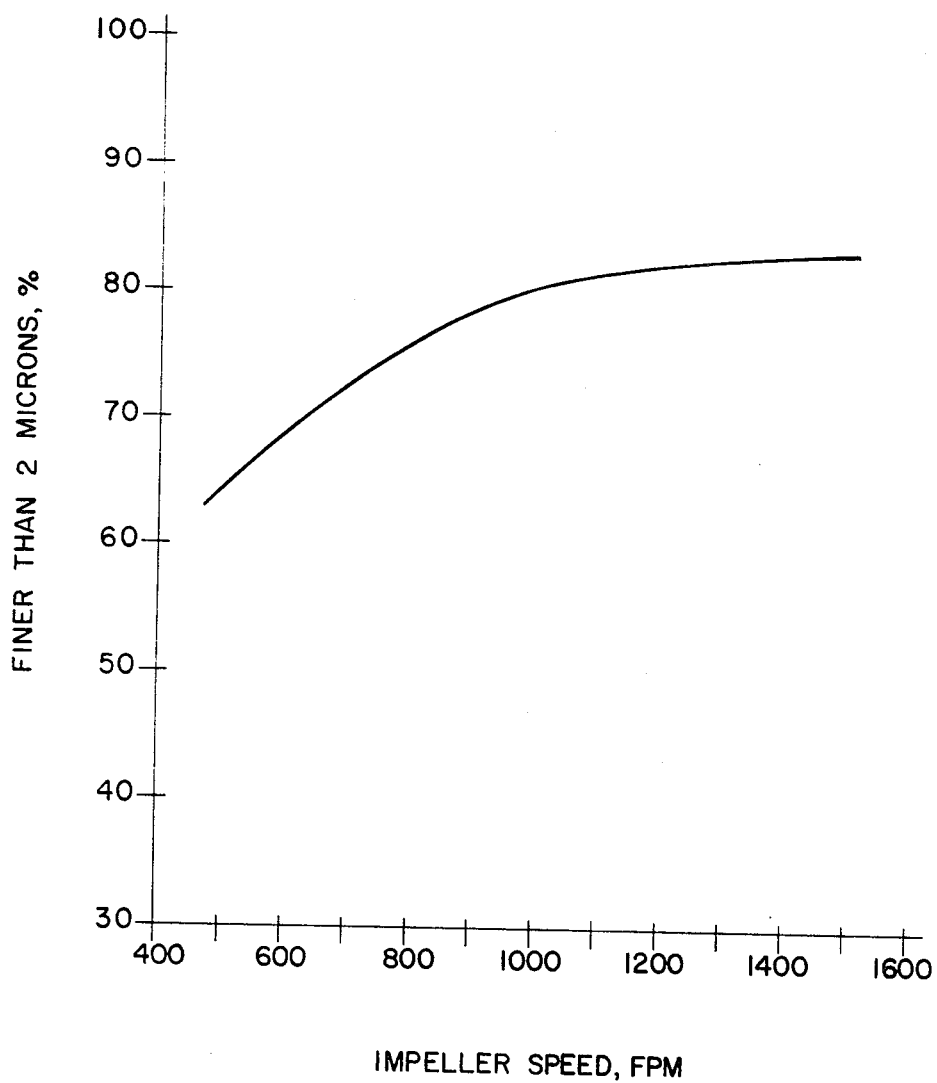
FIG. 3 is a graph showing the effect of the impeller speed in the delamination of the coarse clay-water slurry.

The effect of impeller speed on the grinding rate is illustrated in FIG. 3, for a media/slurry ratio of 55:45, a 30 percent solids concentration slurry, and a retention time of 30 minutes. The grinding rate increased as the impeller speed was increased up to about 1,000 f.p.m. and then leveled off. However, effectiveness of impeller speed varies with such factors as type of impeller, dimensions of impeller and tank, etc.

C. EFFECT OF GRINDING TIME

Figure 4:
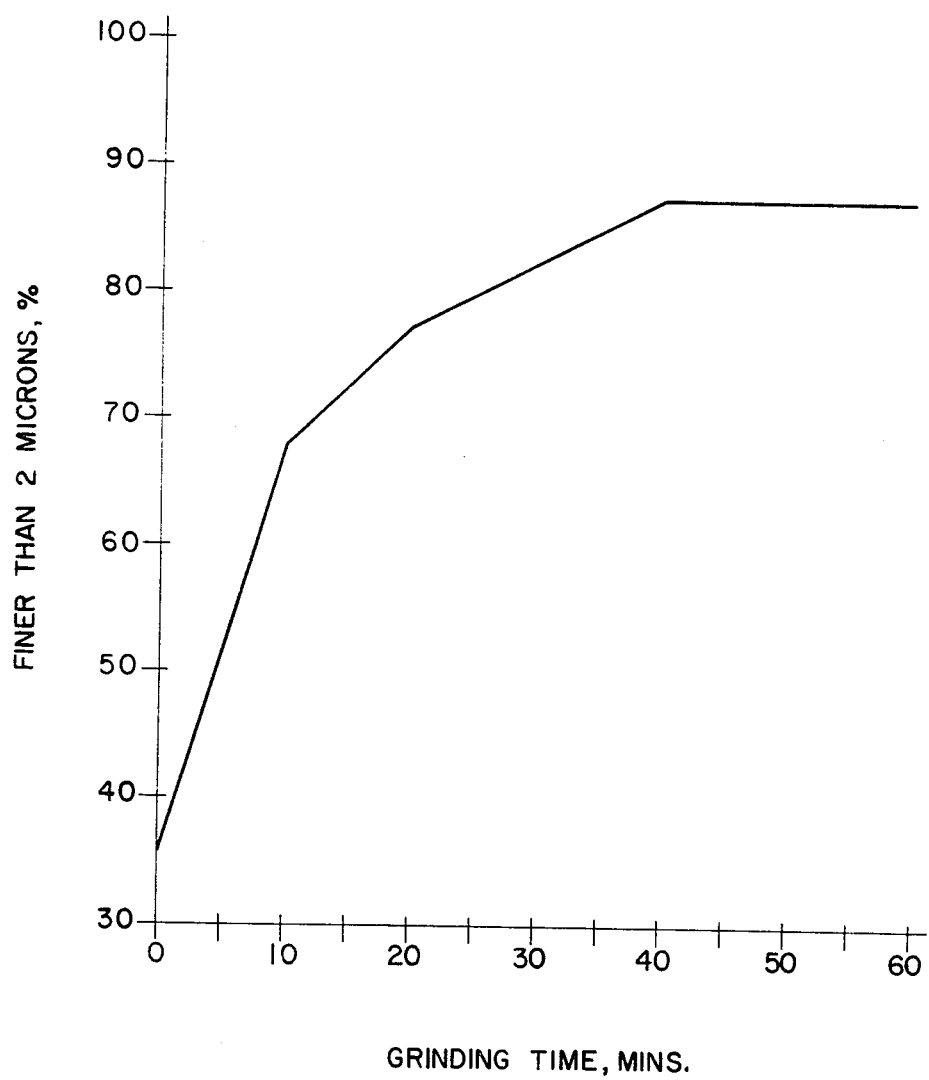
FIG. 4 is a graph showing the effect of grinding time in the delamination step.

The increase in particle fineness with grinding time is shown in FIG. 4 for a 30 percent solids slurry having a media/slurry ratio of 55:45 and subjected to an impeller speed of 1,300 f.p.m. Reduction in particle size is accomplished at a decreasing rate as the mixing time is extended and the clay becomes progressively finer. A particle size of 75 percent minus 2 microns was obtained after mixing for 18 minutes. Further increase in fineness was obtained up to about 40 minutes mixing, after which there was very little significant further particle reduction and such as did occur proceeded very slowly.

D. EFFECT OF SLURRY SOLIDS

Figure 5:
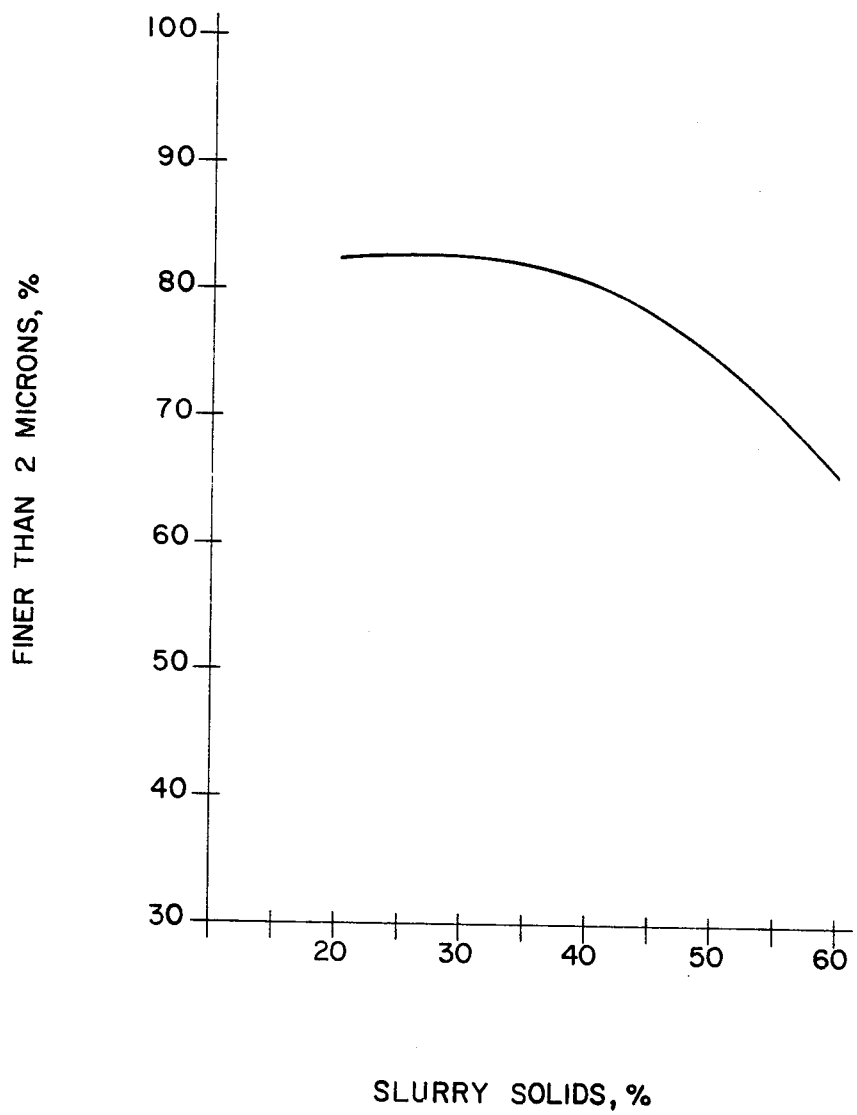
FIG. 5 is a graph showing the effect of the percent of the slurry solids (clay) in the delamination step.

In general, faster grinding was obtained when the dispersed slurry contained less than about 40 percent by weight of clay as shown in FIG. 5 which illustrates the effect of slurry solids on a slurry having a media/slurry ratio of 55:45 with 30 minutes retention and an impeller speed of 1,300 f.p.m. At higher slurry solids, the grinding rate drops off which offsets to some extent, the increased production resulting from the greater amount of clay in the grinding chamber.

E. EFFECT OF MEDIA SIZE

Tests were made with three sizes of glass beads. All were of the same Class IV Type 203 Uni-Spheres supplied by the Cataphote Corporation. Batch size and other conditions of the tests were the same.

| | |
|---|---|
| Media/slurry ratio | 55:45 |
| Impeller speed | 1300 f.p.m. |
| Mixing | 30 minutes |
| Clay-water concentration | 30% clay |

Table I shows particle reduction obtained by delaminating with the three media sizes.

TABLE I

| Media Size | | Finer than 2 Microns, % |
|---|---|---|
| Mesh | Micron-Range | |
| 8–12 | 2380–1680 | 71.2 |
| 20–30 | 840–p54 590 | 82.0 |
| 40–50 | 420–297 | 75.8 |

As shown in Table I faster grinding was obtained with the 20–30 mesh beads than with either the larger or smaller sizes. It appears that the 20–30 mesh size gives about the right compromise between impact intensity, which is greater with the larger and heavier beads and frequency of impact, which is greater with the more numerous smaller beads.

F. EFFECT OF TYPE OF IMPELLER

The rate of grinding obtained with a turbine impeller was compared with that obtained with the standard cross-arm impeller used in all the above tests. The turbine impeller was 3 inches in diameter and had six ½ inch wide blades. Testing conditions were otherwise the same as in E of Example 1. Rate of delamination, as measured by increase in fineness, is shown in Table II.

TABLE II

| Impeller Type | Diameter | Finer than 2 Microns, % |
|---|---|---|
| Cross-arm | 3½" | 82.0 |
| Turbine | 3 | 83.0 |

The two impellers produced about the same amount of particle reduction indicating that the impeller shape is not a critical factor in delamination, provided the impeller is designed to give sufficient flow to keep the entire mixture in suspension.

EXAMPLE 2

In this experiment, a series of tests were made for the purpose of determining the effect of utilizing magnetic treatment to improve the brightness of glass delaminated products. The various effects of magnetic treatment of the starting material prior to delamination, after delamination, and combined treatments (one before the one after delamination) were compared. A magnetic separator was used in the magnetic processing. A 4 inch diameter by 20 inch high magnetic extraction chamber was placed in a vertical position between the magnetic poles of the separator. Dispersed clay slurry at 30 percent solids was pumped into the bottom and flowed from an outlet at the top of the chamber. Flow rate through the chamber was controlled to give a 1 ¼ minute retention of the slurry in the magnetic field. The magnetic field strength was 11,000 gauss at the ends of the chamber and decreased to 6,000 gauss at the center of the chamber.

The starting clay used in this experiment was a filler fraction. The clay particle size was 35.1 percent finer than 2 microns and the brightness was 78.9. In each of the tests the filler was delaminated to 73 percent finer than 2 micron particle size by the previously described one-pass continuous procedure using the apparatus illustrated in FIG. 1. Other conditions of the tests were as follows:

| | |
|---|---|
| Media/slurry volume ratio | 55:45 |
| Impeller speed | 1300 f.p.m. |
| Retention in mixing tank | 30 minutes |
| Clay-water concentration | 30% clay |

The delaminated clays were leached with 6 pounds of zinc dithionite and 6 pounds alum per ton of clay. Greater amounts of the leaching chemicals produced no higher brightness. The progressive effect of the different processing procedures on brightness is shown in Table III.

TABLE III

| | Brigtness Before Leaching | After Leaching |
|---|---|---|
| Test 1 - No magnetic treatment | | |
| Filler clay | 78.9 | |
| After delamination | 80.3 | 85.5 |
| Test 2 - Magnetic treatment before delamination | | |
| Filler clay | 78.9 | |
| After magnetic treatment | 79.8 | |
| After delamination | 83.3 | 87.4 |
| Test 3 - Magnetic treatment after delamination | | |
| Filler clay | 78.9 | |
| After delamination | 80.3 | |
| After magnetic treatment | 81.4 | 85.8 |
| Test 4 - Magnetic treatment before and after delamination | | |
| Filler clay | 78.9 | |
| After magnetic treatment | 79.8 | |
| After delamination | 83.3 | |
| After second magnetic treatment | 83.3 | 87.6 |

As shown in Table III, magnetic treatment was substantially more effective before delamination (Test 2) than after delamination (Test 3).

The effect of the magnetic treatment in Test 2 on the chemical composition of the filler is shown in Table IV.

TABLE IV

| | $Fe_2O_3$ % | $TiO_2$ % | Brightness Not Leached, % |
|---|---|---|---|
| Filler clay before magnetic treatment | 0.40 | 1.62 | 78.9 |
| Filler clay after magnetic treatment | 0.31 | 1.44 | 79.8 |
| Magnetic fraction | 4.06 | 17.48 | 30.0 |

EXAMPLE 3

In this experiment, a filler fraction was treated using a more efficient magnetic separator than was used in the preceeding example. Particle size of the clay was 35.5 percent finer than 2 microns. A two point improvement in brightness was obtained as shown in Table V.

TABLE V

| | $Fe_2O_3$ % | $TiO_2$ % | Brightness Not Leached, % |
|---|---|---|---|
| Filler clay before magnetic treatment | .41 | 1.43 | 79.25 |
| Filler clay after magnetic treatment | .31 | 1.12 | 81.25 |
| Magnetic fraction | 3.33 | 24.41 | 27.7 |

EXAMPLE 4

In this example, delaminated clays were prepared with and without the use of magnetic treatment. The starting material was unleached filler slurry from regular plant production with a brightness of 79.4 and a particle size as follows:

| | |
|---|---|
| Coarser than 10 microns | 15.8% |
| Coarser than 5 microns | 36.2% |
| Finer than 2 microns | 35.9% |

A portion of the filler slurry was magnetically treated in accordance with the procedure of Example 3 resulting in a brightness of 81.5, an improvement of 2.1 points. Slurries with and without the treatment were similarly delaminated by the above described continuous one-pass procedure to a particle size of 72 percent by weight finer than 2 microns using 27.5 minutes retention time in the grinding tank.

The effect of magnetic treatment of the filler slurry on brightness of the delaminated clay is shown in Table VI.

TABLE VI

| | Brightness Before Leaching | After Leaching |
|---|---|---|
| Without magnetic treatment | 81.3 | 85.8 |
| With magnetic treatment | 85.0 | 85.5 |

As shown, the removal of discolored material by the magnetic treatment only resulted in a two point brightness increase in the feed clay but resulted in 3.7 points higher brightness of the delaminated clay prior to leaching. After leaching this improvement resulted in an important 2.7 point gain.

EXAMPLE 4 A

In this example, oversized particles were continuously separated from the delaminated slurry and recycled to the grinding tank for further reduction in size.

The starting feed material to the grinding tank was the same magnetically treated filler slurry used in Example 4. The delaminating apparatus and procedure were the same as in Example 4 except that the overflow slurry from the grinding tank was continuously classified by centrifugation to separate the coarser 20 percent of the clay and this coarse fraction was retuned to the feed slurry for regrinding. It was found that the finer 80 percent of the clay obtained in classifying the overflow slurry from the grinding tank had a particle size of 72 percent by weight finer than 2 microns when the retention time in the grinding tank was adjusted to 14 minutes. Brightness of the delaminated product was the same as that obtained by the one-pass procedure of Example 4. This test showed that an increase in the grinding rate is obtained with the classification and recycling but the advantage of this procedure as compared with the substantially complete delamination in one-pass procedure is offset in part or entirely by the expense and control involved in the extra classification step.

EXAMPLE 5

The effect of the use of magnetic treatment on coating properties was determined in this example on a coated publication grade. The delaminated clays of Example 4 were used in the evaluation.

COATING FORMULA-PROCEDURE NO. 1 - PUBLICATION PAPERS

Coating mixture — 58 percent total solids. 16 parts Stayco M Starch to 100 parts clay.
Rawstock — 29 No. basis weight. 60 percent bleached groundwood and 40 percent bleached kraft.
Coating — 3 ½ No. applied to wire side only by trailing blade on Keegan Coater.
Calendering - 12 nips at 1,200 p.l.i.

Whiteness of the coated paper was determined using a B&L Spectrophotometer to obtain reflectance readings at wave lengths of $B=457$ and $G=530$ millimicrons. The whiteness factor was calculated by the formula 4B—3G with the high value indicating better whiteness. Brightness was determined by the standard TAPPI testing procedure. Effect of the magnetic treatment on brightness and whiteness is shown in Table VII

TABLE VII

COATING EVALUATION ON PUBLICATION

|  | G. E. Brightness | Whiteness |
|---|---|---|
| Without magnetic treatment | 71.9 | 58.5 |
| With magnetic treatment | 72.6 | 60.9 |

As shown, substantial improvements in brightness and whiteness of the coated paper were obtained with the magnetic treatment.

EXAMPLE 6

In this example, the effect of magnetic treatment was also determined on a coated merchant grade where a heavier coating is used. The same two delaminated clays of Example 4 were compared.

COATING FORMULA-PROCEDURE NO. 2 - MERCHANT

Coating mixture — 62 percent total solids. 80.05 parts Stayco M and 6.9 parts Dow Latex. 169 per 100 parts clay.
Rawstock — 51 No. basis weight.
Coating — 7 No. applied to wire side only by trailing blade on Keegan Coater.
Calendering — 4 nips at 1,500 p.l.i.

The considerable effect of magnetic treatment on brightness and whiteness of the coated paper is shown in Table VIII.

TABLE VIII

COATING EVALUATION ON MERCHANT

|  | G. E. Brightness | Whiteness |
|---|---|---|
| Without magnetic treatment | 80.6 | 71.9 |
| With magnetic treatment | 82.2 | 75.4 |

EXAMPLE 7

In this experiment, delaminated clays were prepared from the whole crude clay with and without the use of magnetic treatment.

The crude clay was slurried in water with three pounds Calgon per ton of clay and degritted by settling. The degritted clay had the following particle size:

| Coarser than 10 microns | 4.2% |
| Coarser than 5 microns | 13.0% |
| Finer than 2 microns | 66.6% |

A portion of the degritted slurry containing 30 percent clay solids was magnetically treated by the procedure described in Example 3. Slurries with and without magnetic treatment were similarly delaminated to a particle size of 82.2 percent finer than 2 microns by the continuous one-pass procedure using 10 minute retention time in the grinding tank. Effect of the magnetic treatment on brightness is shown in Table IX.

TABLE IX

| Without Magnetic Treatment | Brightness, % |
|---|---|
| Degritted crude | 82.8 |
| After delamination | 83.7 |
| With Magnetic Treatment |  |
| Degritted crude | 82.8 |
| After magnetic treatment | 83.7 |
| After magnetic treatment and delamination | 85.6 |

Magnetic treatment improved brightness of the delaminated clay by 1.9 points.

EXAMPLE 8

In this experiment, the tests in Example 7 were repeated except for increasing retention time in the grinding tank to 52 minutes to obtain more complete delamination and products having a particle size of 92 percent finer than 2 microns. Effect of magnetic treatment on brightness is shown in Table X.

TABLE X

| Without Magnetic Treatment | Brightness, % |
|---|---|
| Degritted crude | 82.8 |
| After delamination | 84.4 |
| With Magnetic Treatment |  |
| Degritted crude | 82.8 |
| After magnetic treatment | 83.7 |
| After magnetic treatment and delamination | 86.6 |

This experiment shows that the whole crude clay can be reduced the fineness of a No. 1 conventional coating grade in one pass through the high intensity grinding apparatus and that brightness of the delaminated product is very significantly enhanced by the magnetic treatment.

EXAMPLE 9

In this experiment, a coating fraction was delaminated with and without the use of magnetic treatment.

A crude clay was slurried in water with 3 pounds Calgon per ton of clay and classified by centrifugation to separate a No. 2 grade coating fraction having the following particle size:

| | |
|---|---|
| Coarser than 10 microns | 0.7% |
| Coarser than 5 microns | 2.2% |
| Finer than 2 microns | 82.3% |

A portion of the No. 2 grade coating fraction slurry containing 30 percent clay solids was magnetically treated as in Example 3. Slurries with and without the magnetic treatment were similarly delaminated to a particle size of 93.1 percent finer than 2 microns by the continuous one-pass procedure using a grinding rate of 30 minutes in the grinding tank. Effect of the magnetic treatment on brightness is shown in Table XI.

TABLE XI

| Without Magnetic Treatment | Brightness, % |
|---|---|
| No. 2 Coating Fraction | 83.1 |
| After Delamination | 83.4 |
| With Magnetic Treatment | |
| No. 2 Coating Fraction | 83.1 |
| After Magnetic Treatment | 84.0 |
| After Magnetic Treatment and Delamination | 86.1 |

As should be readily apparent in view of the foregoing examples, the present invention provides a unique, highly efficient process for preparing delaminated coating clays. While the aforementioned examples set forth specific embodiments and process conditions for practicing the invention, it should be expressly understood that the invention is not limited thereto. Further, since many different embodiments of the invention, such as variations in the type of equipment employed, will be readily apparent to those skilled in the art, the invention is not limited to such details disclosed for illustrative purposes. Further the method of the present invention is applicable to materials other than kaolinite such as pyrophyllite, mica, natural and synthetic silica pigments, talc, etc., where fast and economical grinding to a fine particle size without degradation in brightness and whiteness by the comminution of magnetic discoloring material is required.

It should be borne in mind that in many processes, including clay processing, even minor improvements in the properties of the feed material may result in significant improvements in the end product.

While the present invention finds particular use in the processing of and production of delaminated clays the present invention is not limited to such applications but rather may be employed in any process in which contaminants susceptable of magnetic separation are involved and in which the process necessarily or desirably involves particle size reduction, defoliation, exfoliation, comminution, fracturing, grinding, kneading, extrusion or the like. The term delamination as used herein is intended to broadly include such alternative particle size reductions, whether preferential or not, as well as the more limited meaning commonly given it in referring to the preferential fracturing of clays.

For example a coarse filler grade clay with an initial G. E. brightness of 76.2 and having 7.9 percent of its particle less than 2 microns may be increased to a brightness of 80.0 by magnetic separation. This clay was pugmilled to have approximately 28 percent of its particles less than 2 microns. After classification to obtain a clay with approximately 70 percent by weight of the particles less than minus 2 microns the finished clay produced showed a G. E. brightness of 88.4 with magnetic treatment as opposed to 87.4 for the control clay which was not magnetically treated.

A commercially obtained New York natural talc having less than 0.01% $TiO_2$ and only 0.17 percent iron when treated according to the teachings of the present invention increased in G. E. brightness from 88.2 to 92.6. While the improvement in brightness is not numerically great, it should be noted that the contaminants to be removed and/or ground were present in only small amounts.

It is believed clear from the above description that the combination claimed hereinafter of pre-treatment by magnetic separation followed by comminution and/or delamination is a particularly advantageous combination producing unexpected improvements in brightness apparently solely through the synergistic effect of the claimed combination. The combination of the magnetic separation pre-treatment and comminution is made possible and effective through the use of intense grinding by hard, abrasive grinding media to produce a high brightness product while employing fast, economical grinding rates. The combination of magnetic pre-treatment and the special type of grinding produced by hard, abrasive grinding media which may be utilized not only as a means of comminution but also as a means of delamination when utilized in a suitable slurry produce improvements in brightness not readily obtainable by other means or even by the same process steps when not employed in accordance with the teachings of the present invention.

Although specific preferred embodiments of the present invention have been described in the detailed description above, the present description and drawings are not intended to limit the invention to the particular forms and embodiments disclosed herein, since they are to be recognized as illustrative rather than restrictive and it will be obvious to those skilled in the art that the invention is not so limited. The invention is declared to cover all changes and modifications of the specific examples of the invention herein disclosed for purposes of illustration, which do not constitute departures from the spirit and scope of the invention as defined by the following claims and their reasonable and obvious equivalents.

We claim:

1. A method for reducing the particle size and increasing the brightness of minerals, said method comprising the steps of subjecting an aqueous slurry of said minerals to a high intensity magnetic field of at least 8,500 gauss for a period of time in the range of from about 10 seconds to 8 minutes so as to effect separation of magnetically susceptible contaminants from said minerals; withdrawing said aqueous slurry from said magnetic field; subjecting at least a portion of said minerals suspended in said slurry to agitation in the presence of a granular grinding medium harder than the mineral solids to be ground for a period of time to effect substantially complete delamination of said minerals and to produce a mineral product having a G. E. brightness of at least 80, and recovering the ground mineral fraction of reduced particle size from said slurry.

2. The method in accordance with claim 1 wherein said minerals are kaolinitic coating clays and the aqueous slurry is a dispersed kaolin clay-water slurry, said method further comprising continuing said agitation to produce a clay fraction having a particle size of less than 2 microns.

3. The method in accordance with claim 2 wherein said granular grinding medium is glass beads which occupy at least 40 percent of the volume of the solids in the delamination of said coarse clay fractions, said glass beads having diameters in the range of from about 20 mesh to 30 mesh on the Tyler standard screen scale.

4. The method in accordance with claim 2, said method further comprising preparing a kaolin clay-water slurry of predetermined solids content, passing said slurry through a magnetic separator substantially continuously, retaining said slurry within the high intensity magnetic field of said separator for from approximately 10 seconds to 8 minutes, passing said magnetically separated slurry to a feed tank, establishing a predetermined kaolin solids content and particle size within said feed tank, pumping slurry from said feed tank through a variable speed pump to a delamination vessel at a controlled flow rate to maintain the predetermined conditions within said delamination vessel and maintain a predetermined retention time within said delamination vessel.

* * * * *